Aug. 31, 1965  TAKAICHI MABUCHI  3,204,138
BRUSH MOUNTING FOR ELECTRIC MOTORS
Filed Feb. 28, 1963  2 Sheets-Sheet 1

Takaichi MABUCHI
INVENTOR.

BY McGlew and Toren,
Attorneys

# United States Patent Office 3,204,138
Patented Aug. 31, 1965

3,204,138
BRUSH MOUNTING FOR ELECTRIC MOTORS
Takaichi Mabuchi, 262 Honden-cho, Katsushika-ku, Tokyo, Japan
Filed Feb. 28, 1963, Ser. No. 261,768
9 Claims. (Cl. 310—239)

The present invention relates to an assembling method of miniature electric motors, more particularly relates to the brush attachment means thereof.

An object of this invention is to supply a brush attachment means in the assembly of miniature electric motors whereby the miniature electric motors can be assembled in an easy and quick manner in a unit system, i.e. in a conveyer system.

Another object of this invention is to supply a brush attachment means in the assembly of miniature electric motors whereby the contact of the brushes of the miniature electric motors with the ammutator thereof is made easier and accurately.

Another object of this invention is to supply a brush attachment means in the assembling of miniature electric motors whereby are obtainable smoothly and quietly running miniature electric motors, wherein the noise of vibration of the brushes thereof is being absorbed.

Still another object of this invention is to supply a brush attachment means in the assembling of miniature electric motors whereby the brush attachment plates can be secured on the cover plate without employing any fixtures.

Still a further object of this invention is to supply a brush attachment means in the assembling of miniature electric motors whereby the setting of the position of the brush attachment plates of the miniature electric motors and the secured holding of said brush attachment plates are attainable in having one end each of the brush attachment plates extendedly being made to the terminals of the electric circuit thereof as the protruded conductors through a hole provided on the cover plate.

With the objects stated hereinabove and other objects that will be described hereinafter the arrangement of the parts of said brush attachment means will be described in the following specification and stated in the claims accompanied herewith.

Figure 1:
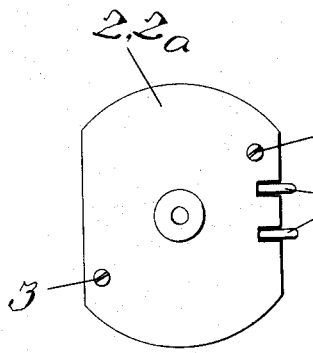
Figure 2:
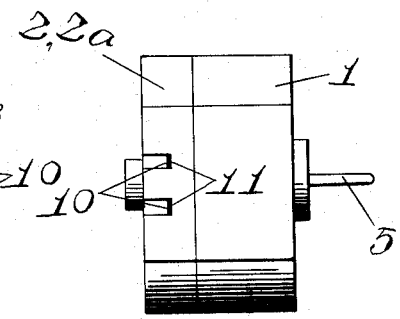
Figures 3, 4:
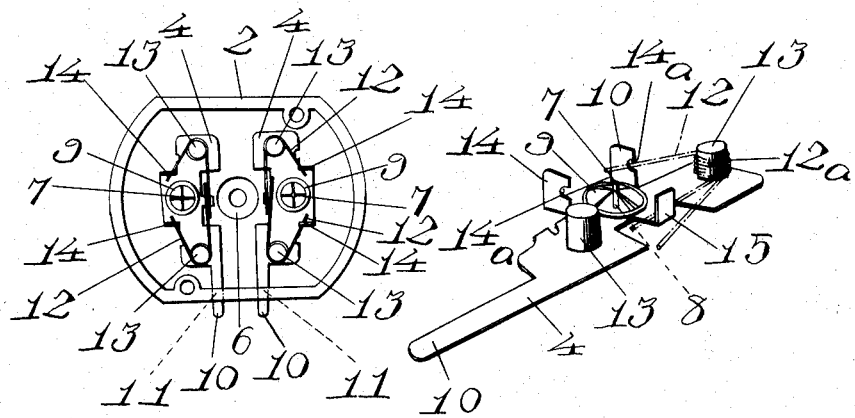
Figure 5:
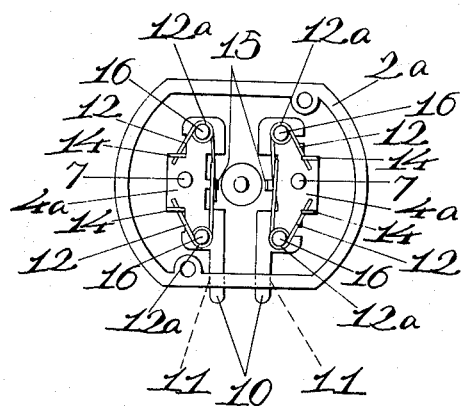
Figure 6:
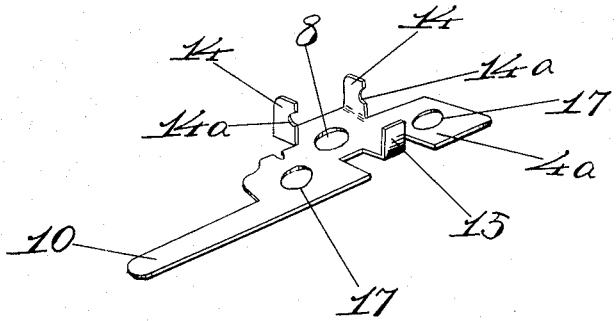

In the accompanying drawings illustrating embodiments of this invention:

FIG. 1 is the front elevation of a miniature electric motor provided with the brush attachment means according to this invention;

FIG. 2, a side view thereof;

FIG. 3, the front elevation of the inner side of the cover plate showing the essential constituent parts thereof;

FIG. 4 is a perspective view of the brush, brush holder and terminal assembly;

FIG. 5, a perspective view of the inner side of the cover plate of another embodiment according to this invention;

FIG. 6, a perspective view of a brush attachment plate of the above embodiment.

Now, describing in detail with reference to the accompanying drawings, in FIGS. 1–4 numeral 1 indicates the outer casing containing the main bodies of the motor such as magnets, windings, and the like, numeral 2 the cover plate to be fitted on insertedly into the open end of the outer casing 1, being formedly by molding as insulating material like plastics and properly secured to the outer casing 1 by means of set screws 3 for instance. Numerals 4, 4 indicate brush attachment plates made of electro-conductive metallic plates and are secured opposedly on the left and the right of the bearing 6 supporting the motor shaft 5 and the method of securing thereof is performed by having projections 7 formed on the inner side of the cover plate 2 as shown in FIGS. 3 and 4, the attachment plates 4, 4 being fitted through the holes 8 provided thereon, and in addition by means of speed nuts 9, a central hole in each of which is formed by several resilient radial pieces and which will be secured tightly by the resiliency of the radial pieces when once the projection is fitted thereinto or the brush attachment plates may be secured to the cover plate by means of set screws or by any other means, but the brush attachment plates can further be stably secured when the terminals formed by having each of one end of the brush attchment plates extended are insertedly fitted through a hole 11 bored through the cover plate 2.

On each of the brush attachment plates are formed projections 13 for insertedly holding the coiled portions 12a of filament brushes, upright engaging members 14 with slots 14a each of which engages each of the ends of the filament brushes 12, and upright engaging members 15 each of which engages each of the other ends of the filament brushes, but in order to prevent the slipping of the coiled portions 12a of the brushes 12, off said projections 13 discs made of plastics or vulcanized fibers may be fitted on to the projections 13.

FIGS. 5 and 6 show another embodiment according to this invention wherein the brush attachment plates are secured to the cover plate by another means, and in the drawings numeral 2a indicates the cover plate and numeral 4a the brush attachment plates, and on the brush attachment plates are formed the engaging members 14 with slots 14a, and the upright engaging members 15, the terminals 10, and the holes 8 for the projections 7 are also formed in a similar manner as in the foregoing embodiment.

However, in this embodiment the projections 16 for insertedly holding the coiled portions 12a of the filament brushes 12 are formed on the cover plate 2a instead, and the holes, whereinto the projections are inserted, are provided on the brush attachment plates 4a, and the brush attachment plates are so adapted as to be secured at their proper positions by having simply holes 8, 17, 17 fitted onto the projections, 7, 16, 16, without employing set screws or any other means. Also, the cover plate may be made of a metal with a seat provided with said construction affixed on the inner side of the metal cover plate.

Furthermore, although said terminals 10 are extendedly formed in the same plane as the main body of the brush attachment means 2, 2a in the foregoing embodiments, the terminals may be formed with bent 90° with said plane.

With having the coiled portions 12a of the filament brushes 12 fitted onto the projections 13 or 16, the ends thereof being engaged the slots 14a of the upright engaging members 14 and the other ends thereof being engaged temporarily the upright engaging members 15, in having the ends of the linear brushes 12 engaging the engaging members 15 made to disengage the upright engaging members 15 when the cover plate is to be affixed to the outer casing, whereby the filament brushes are contacted with the commutator of the motor.

In the assembling of the miniature electric motor according to this invention, as described hereinabove, the brush attachment plates, the brushes themselves, the cover plate, and the outer casing thereof are easily and quickly assembled by a conveyor system, and the contact of the brushes with the commutator of the motor are accurately made, and naturally with the reduction of the manufacturing cost the product of better characteristics can be supplied, and in addition to that, as the noise of friction of the brushes is absorbed by the projections through the coiled portion of the brushes, various salient functional effects such as quietly and smoothly running of the motor can be obtained and thereby the objects stated in the beginning hereof are achievable.

The present invention has been described with reference to the embodiments hereinabove, but this invention is not restricted at all by the above-described embodiments and it is self-apparent that this invention includes all the constructions within the scope of the accompanying claims hereof.

I claim:

1. A brush mounting construction for an electric motor comprising a motor housing having a wall with a terminal opening defined therethrough, a securement projection defined on the interior of said housing, a brush attachment plate of conductive material having an opening through which said securement fitting extends for fastening said brush attachment plate in position within said housing, said brush attachment plate having an elongated portion extending through the terminal opening forming a brush terminal, and an electrical contact brush carried by said brush attachment plate.

2. A brush mounting construction for an electric motor comprising a motor housing having a wall with a terminal opening defined therethrough, a securement projection defined on the interior of said housing, a brush attachment plate having an opening through which said securement projection extends for fastening said brush attachment plate in position within said housing, said brush attachment plate having an elongated portion extending through the terminal opening forming a brush terminal, said brush attachment plate and interior of said motor housing wall having a cooperative projection and recess defined thereon for interengagement for fastening said brush attachment plate in position within said housing and an electrical contact brush carried by said brush attachment plate.

3. A brush mounting construction for an electric motor comprising a motor housing having a wall with a terminal opening defined therethrough, a brush attachment plate of electrically conductive material, said brush plate and said housing wall defining means for fastening said brush attachment plate in position within said housing, said brush attachment plate having an elongated portion extending through the terminal opening forming a brush terminal, means defining a brush mounting post located to project outwardly from said brush attachment plate, said attachment plate having a projection on each side of said mounting post and an electrical contact brush extending around said mounting post and having respective ends engaged against respective projections on each side of said mounting post.

4. A brush mounting construction for an electric motor comprising a motor housing having a wall with a terminal opening defined therethrough, a securement projection defined on the interior of said housing, a brush attachment plate having an opening through which said securement fitting extends for fastening said brush attachment plate in position within said housing, said brush attachment plate having an elongated portion extending through the terminal opening forming a brush terminal, means defining a brush mounting post located to project outwardly from said brush attachment plate, said attachment plate having projection on each side of said mounting post, an electrical contact brush extending around said mounting post and having respective ends engaged against respective projections on each side of said mounting post said housing wall defining said means forming a mounting post.

5. A brush mounting construction for an electric motor comprising a motor housing having a wall with a terminal opening defined therethrough, a securement projection defined on the interior of said housing, a brush attachment plate having an opening through which said securement fitting extends for fastening said brush attachment plate in position within said housing, said brush attachment plate having an elongated portion extending through the terminal opening forming a brush terminal, said brush attachment plate having a projection defining a brush mounting post located to project outwardly from said brush attachment plate, said attachment plate having a projection on each side of said mounting post said electrical contact, an electric contact brush extending around said mounting post and having respective ends engaged against respective projections on each side of said mounting post.

6. An electric motor brush construction comprising a motor housing having an end wall with a terminal opening defined therethrough on each side of its center, a brush attachment plate located within said housing on each side of the center thereof, each of said attachment plates having an elongated portion extending through a respective one of said terminal openings and forming a brush terminal projecting outwardly from said housing, and interengageable securement projection and recess means defined on the interior of said housing wall and said brush attachment plate for fastening said brush attachment plates in position in said housing on each side of the respective side of the center thereof, and an electrical contact brush carried by each of said brush attachment plates.

7. An electric motor brush construction comprising a motor housing having an end wall with a terminal opening defined therethrough on each side of its center, a brush attachment plate located within said housing on each side of the center thereof, each of said attachment plates having an elongated portion extending through a respective one of said terminal openings and forming a brush terminal projecting outwardly from said housing, and interengageable securement projection and recess means defined on the interior of said housing wall and said brush attachment plate for fastening said brush attachment plates in position in said housing on respective sides of the center thereof, and an electrical contact brush carried by each of said brush attachment plates each of said attachment plates including a portion defining a mounting post for an electrical contact brush and a projection on each side of said mounting post, said contact brush including a resilient element engaged around said post and having ends biased into engagement with each of the respective projections on each side of said mounting post.

8. An electric motor brush construction comprising a motor housing having an end wall with a terminal opening defined therethrough on each side of its center, a brush attachment plate located within said housing on each side of the center thereof, each of said attachment plates having an elongated portion extending through a respective one of said terminal openings and forming a brush terminal projecting outwardly from said housing, and interengageable securement projection and recess means defined on the interior of said housing wall and said brush attachment plate for fastening said brush attachment plates in position in said housing on each side of the respective side of the center thereof, and an electrical contact brush carried by each of said brush attachment plates each of said attachment plates including a portion defining a mounting post for an electrical contact brush and a projection on each side of said mounting post, said contact brush including a resilient element engaged around said post and having ends biased into engagement with each of the respective projections on each side of said mounting post, an additional mounting post with additional projections on each side thereof defined on an opposite end of said attachment plate from said mounting post and said projections and including an additional brush engaged around said mounting post and biased against respective additional projections on each side of said additional mounting post.

9. An electric motor brush construction comprising a motor housing having an end wall with a terminal opening defined therethrough on each side of its center, a brush attachment plate located within said housing on each side of the center thereof, each of said attachment plates having an elongated portion extending through a respective one of said terminal openings and forming a brush terminal projecting outwardly from said housing, and interengageable securement projection and recess means defined on the interior of said housing wall and said brush attachment plate for fastening said brush attachment plates in position in said housing on each side of the respective side of the center thereof, and an electrical contact brush carried by each of said brush attachment plates, each of said attachment plates including an upturned strip portion defining a mounting post for an electrical contact brush including a resilient conductive element engaged around said post and having ends biased into engagement with each of the respective projections on each side of said mounting post.

References Cited by the Examiner
UNITED STATES PATENTS

| | | | |
|---|---|---|---|
| 2,029,782 | 2/36 | Mead | 310—244 |
| 2,343,546 | 3/44 | Fuge et al. | 310—244 |

ORIS L. RADER, *Primary Examiner.*

MILTON O. HIRSHFIELD, *Examiner.*